DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 9

T917,005

PIPE CEMENT

Everett Walter Knight, Wilmington, Del., assignor to E. I. du Pont de Nemours and Company, Wilmington, Del.

Filed Dec. 15, 1972, Ser. No. 315,562

Int. Cl. C08f *29/18, 45/04, 45/28*

U.S. Cl. 260—30.4 R

No Drawing. 8 Pages Specification

A cement composition is provided for PVC and CPVC pipes which contain from about 10 to about 18 parts by weight of pipe grade PVC resin or pipe grade CPVC resin, from about 55 to about 75 parts by weight of tetrahydrofuran, from about 3 to about 9 parts by weight of a high boiling solvent, from about 1 to about 7 parts by weight of a micro colloidal silica powder and from about 5 to about 25 parts by weight of a nonsolvent for the pipe grade PVC and/or CPVC resins.